United States Patent
Kanayama (10) Patent No.: US 10,564,525 B2
(45) Date of Patent: Feb. 18, 2020

(54) IMAGE CAPTURING APPARATUS, SUPPORT APPARATUS, AND METHODS OF CONTROLLING THESE

(71) Applicant: CANON KABUSHIKI KAISHA, Tokyo (JP)

(72) Inventor: Toshihide Kanayama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/152,593

(22) Filed: Oct. 5, 2018

(65) Prior Publication Data

US 2019/0107769 A1 Apr. 11, 2019

(30) Foreign Application Priority Data

Oct. 10, 2017 (JP) .................... 2017-197056

(51) Int. Cl.
| | |
|---|---|
| G03B 17/02 | (2006.01) |
| H02J 50/90 | (2016.01) |
| H02J 50/40 | (2016.01) |
| G03B 17/56 | (2006.01) |

(52) U.S. Cl.
CPC .......... *G03B 17/561* (2013.01); *G03B 17/02* (2013.01); *H02J 50/40* (2016.02); *H02J 50/90* (2016.02); *G03B 2217/007* (2013.01)

(58) Field of Classification Search
CPC ....... G03B 17/561; G03B 17/02; H02J 50/40; H02J 50/90
See application file for complete search history.

(56) References Cited

U.S. PATENT DOCUMENTS

2010/0034530 A1* 2/2010 Son .................... G03B 17/00
396/427

FOREIGN PATENT DOCUMENTS

JP 2007-053690 A 3/2007

* cited by examiner

*Primary Examiner* — Clayton E. LaBalle
*Assistant Examiner* — Linda B Smith
(74) *Attorney, Agent, or Firm* — Cowan, Liebowitz & Latman, P.C.

(57) ABSTRACT

An image capturing apparatus comprising a sphere portion for performing image capturing and a support unit that supports the sphere portion, wherein the sphere portion comprises: an image capturing unit; and a power reception unit configured to wirelessly receive a supply of power, and the support unit comprises: support portions that support the sphere portion, each support portion having a driving motor, a power transmission unit configured to wirelessly supply power to the power reception unit, and a detection unit configured to detect a power supply efficiency; and a control unit configured to, based on power supply efficiencies, select the power transmission unit arranged in one support portion, and, based on a position of the selected power transmission unit, control the driving motor so that the sphere portion aligns to a predetermined reference position.

14 Claims, 5 Drawing Sheets

|  | | FIRST DRIVING DIRECTION | SECOND DRIVING DIRECTION |
|---|---|---|---|
| X | FIRST WIRELESS POWER TRANSMISSION UNIT | LEFT | DOWN |
| | SECOND WIRELESS POWER TRANSMISSION UNIT | DOWN | LEFT |
| | THIRD WIRELESS POWER TRANSMISSION UNIT | RIGHT | DOWN |

IMAGE CAPTURING APPARATUS, SUPPORT APPARATUS, AND METHODS OF CONTROLLING THESE

BACKGROUND OF THE INVENTION

Field of the Invention

The present invention relates to an image capturing apparatus having a function for supplying power wirelessly to an image capturing unit arranged in a sphere.

Description of the Related Art

A panhead image capturing system is used by a monitoring camera system or the like, and it is possible to change the orientation of a camera by causing the camera to perform a pan operation and a tilt operation in accordance with causing an actuator such as a motor to operate. Many panhead image capturing systems are realized by a gimbal structure. However, because it is difficult to miniaturize a gimbal structure, a sphere structure is proposed in order to realize a small panhead image capturing system.

A sphere structure is a structure where an image capturing unit is embedded in a sphere, and, by causing an actuator such as a motor arranged on a base that supports the sphere to operate, it is possible to change a direction of a camera to be any direction in 360°, including a pan operation and a tilt operation with respect to a base. In the case of a sphere structure, a gimbal structure is unnecessary, and, by merely incorporating an image capturing unit in the sphere and incorporating actuators in the base, it is possible to realize driving of the image capturing unit with multiple degrees of freedom.

In addition, with such a sphere structure, it is desirable that power for causing the image capturing unit arranged in the sphere to operate be supplied wirelessly. If power is supplied wirelessly, there is an advantage of not inhibiting movement in multiple degrees of freedom in comparison to a case of supplying power for image capturing by wire.

In order to accurately control the orientation of an image capturing unit arranged in a sphere to be an orientation designated by a user, it is necessary to decide in advance a reference position which is an orientation of the image capturing unit in the sphere that is a reference for control.

In a conventional pinhead image capturing system disclosed by Japanese Patent Laid-Open No. 2007-053690, a photosensor is fixed at a position separated from a movement center of a pan operation or a tilt operation, and the reference position is detected by a light-shielding plate, which moves in the pan and tilt directions together with the camera, shielding the photosensor. However, with the method disclosed by Japanese Patent Laid-Open No. 2007-053690, there is the problem that it is necessary to incorporate a light-shielding plate and a type of sensor such as a photosensor in order to detect the reference position, and this leads to an increase in size and higher cost of the camera.

In addition, with the conventional technique disclosed by Japanese Patent Laid-Open No. 2007-053690, a sphere in which an image capturing unit is incorporated and a base for causing the sphere to move are connected by wire, and necessary power is transmitted to the sphere from the base by wire. Accordingly, there is also the problem of a power transmission line inhibiting movement with multiple degrees of freedom of the sphere.

SUMMARY OF THE INVENTION

The present invention is made in view of the problems described above, and provides an image capturing apparatus that can align a sphere-shaped camera to a reference position without the addition of a special sensor, while supplying power to the camera wirelessly.

According to a first aspect of the present invention, there is provided an image capturing apparatus comprising a sphere portion operable to perform image capturing and a support unit for supporting the sphere portion, wherein the sphere portion comprises: an image capturing unit configured to capture an object image; and a power reception unit configured to wirelessly receive a supply of power, and the support unit comprises: a plurality of support portions that support the sphere portion, each support portion having a driving motor configured to rotationally drive the sphere portion, a power transmission unit configured to wirelessly supply power to the power reception unit, and a detection unit configured to detect a power supply efficiency by the power transmission unit; and a control unit configured to, based on power supply efficiencies detected by the detection unit, select the power transmission unit arranged in one support portion out of the plurality of support portions, and, based on a position of the selected power transmission unit, control the driving motor so that the sphere portion aligns to a predetermined reference position.

According to a second aspect of the present invention, there is provided a support apparatus operable to support a sphere portion provided with an image capturing unit operable to capture an object image and a power reception unit operable to wirelessly receive a supply of power, the apparatus comprising: a plurality of support portions that support the sphere portion, each support portion having a driving motor configured to rotationally drive the sphere portion, a power transmission unit configured to wirelessly supply power to the power reception unit, and a detection unit configured to detect a power supply efficiency by the power transmission unit; and a control unit configured to, based on power supply efficiencies detected by the detection unit, select the power transmission unit arranged in one support portion out of the plurality of support portions, and, based on a position of the selected power transmission unit, control the driving motor so that the sphere portion aligns to a predetermined reference position.

According to a third aspect of the present invention, there is provided a method of controlling an image capturing apparatus provided with: a sphere portion provided with an image capturing unit configured to capture an object image and a power reception unit configured to wirelessly receive a supply of power, and a support unit provided with a plurality of support portions that support the sphere portion, each support portion having a driving motor configured to rotationally drive the sphere portion, a power transmission unit configured to wirelessly supply power to the power reception unit, and a detection unit configured to detect a power supply efficiency by the power transmission unit, the method comprising: based on power supply efficiencies detected by the detection unit, selecting the power transmission unit arranged in one support portion out of the plurality of support portions, and, based on a position of the selected power transmission unit, controlling the driving motor so that the sphere portion aligns to a predetermined reference position.

According to a fourth aspect of the present invention, there is provided a method of controlling a support apparatus provided with a plurality of support portions configured to support a sphere portion provided with an image capturing unit configured to capture an object image and a power reception unit configured to received supply of power wirelessly, each support portion having a driving motor configured to rotationally drive the sphere portion, a power transmission unit configured to wirelessly supply power to the power reception unit, and a detection unit configured to detect a power supply efficiency by the power transmission unit, the method comprising: based on power supply efficiencies detected by the detection unit, selecting the power transmission unit arranged in one support portion out of the plurality of support portions, and, based on a position of the selected power transmission unit, controlling the driving motor so that the sphere portion aligns to a predetermined reference position.

Further features of the present invention will become apparent from the following description of exemplary embodiments with reference to the attached drawings.

DESCRIPTION OF THE EMBODIMENTS

Figure 1:
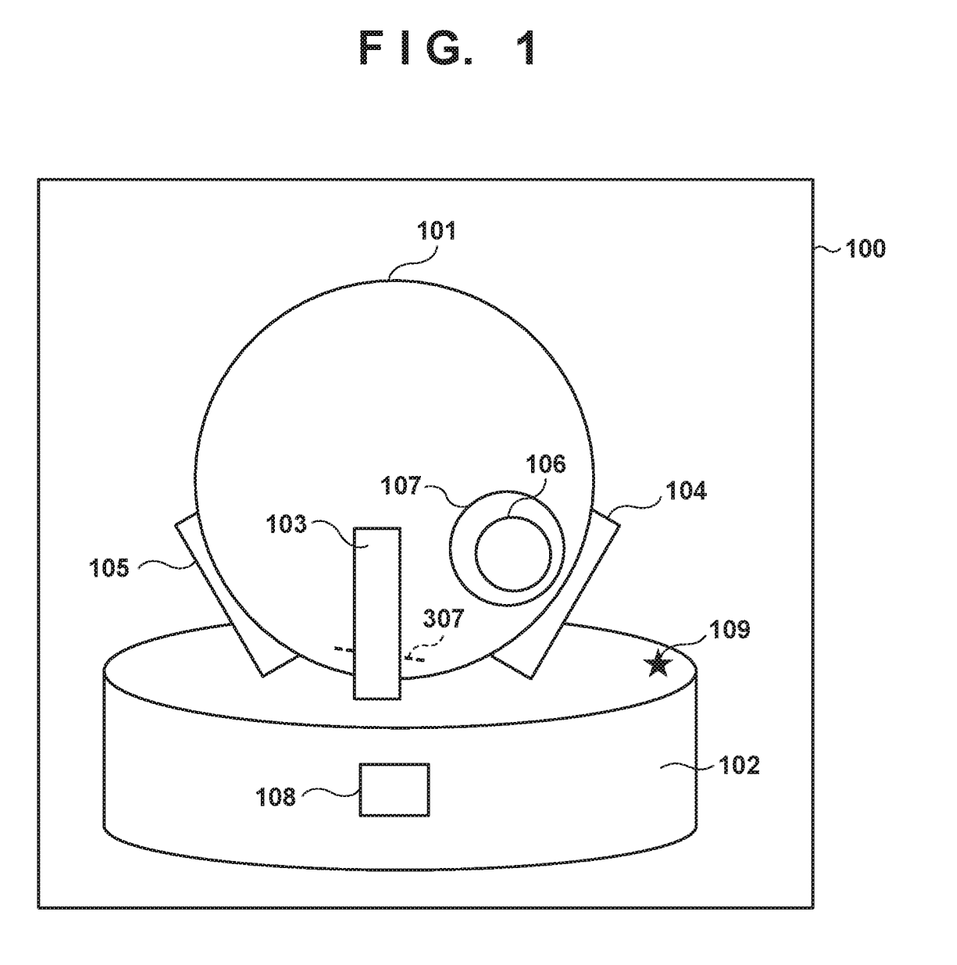
FIG. 1 is an external perspective view of an image capturing apparatus according to an embodiment of the present invention.

Explanation in detail is given below with reference to the attached drawings, regarding embodiments of the present invention. FIG. 1 is an external perspective view of a case where an image capturing apparatus 100 according to an embodiment of the present invention is positioned at a reference position.

In FIG. 1, the image capturing apparatus 100 is configured so that a sphere portion 101 that incorporates an image capturing unit is supported with respect to a base portion 102, and the sphere portion 101 can rotate 360° with respect to the base portion 102 in a vertical direction, a horizontal direction, and a diagonal direction. The sphere portion 101 is provided with the image capturing unit which is necessary for image capturing, and a wireless communication unit for communicating with the base portion 102. The base portion 102 performs processing of captured image data received from the sphere portion 101, and control for causing the sphere portion 101 to undergo a rotation operation in a designated direction.

The sphere portion 101 is supported by a first support portion 103, a second support portion 104, and a third support portion 105 which are fixed to the base portion 102. The first support portion 103, the second support portion 104, and the third support portion 105 are each provided with a driving motor for rotationally driving the sphere portion 101 freely while supporting the sphere portion 101, and a wireless power transmission unit for supplying power to the sphere portion 101 wirelessly.

Note that a structure that supports the sphere portion 101 at a plurality of locations is desirable, in order to reduce vibration of the sphere portion 101 at a time of image capturing. In the present embodiment, support is by three locations (the first support portion 103, the second support portion 104, and the third support portion 105), but the number of support points is not limited to three points, and may be four points or more.

The sphere portion 101 has an image capturing optical system 106 which is provided with a lens and a shutter, and the image capturing optical system 106 causes an object image to form on a light-receiving surface of an image capturing element such as a CCD or a CMOS sensor that configures the image capturing unit. A lens barrel 107, in a state of holding the image capturing optical system 106, can protrude from a retracted state and freely move with respect to a sheathing part of the sphere portion 101. In addition, although detail is described later using FIG. 3, the sphere portion 101 has a wireless power receiving unit 307 for wirelessly receiving the supply of power from the base portion 102. The wireless power receiving unit 307 is indicated by a dashed line because it is arranged in the sphere portion 101.

A power supply switch 108 is arranged in the base portion 102, and it is possible to switch between the power supply of the image capturing apparatus 100 being on and off. A visual mark 109 is formed on the base portion 102 in accordance with, printing, engraving, bonding of a sticker, or the like, and the image capturing optical system 106 is configured so that it can capture the mark 109. More specifically, when the sphere portion 101 is positioned at the reference position, the mark 109 is included in an image captured via the image capturing optical system 106.

Figure 2:
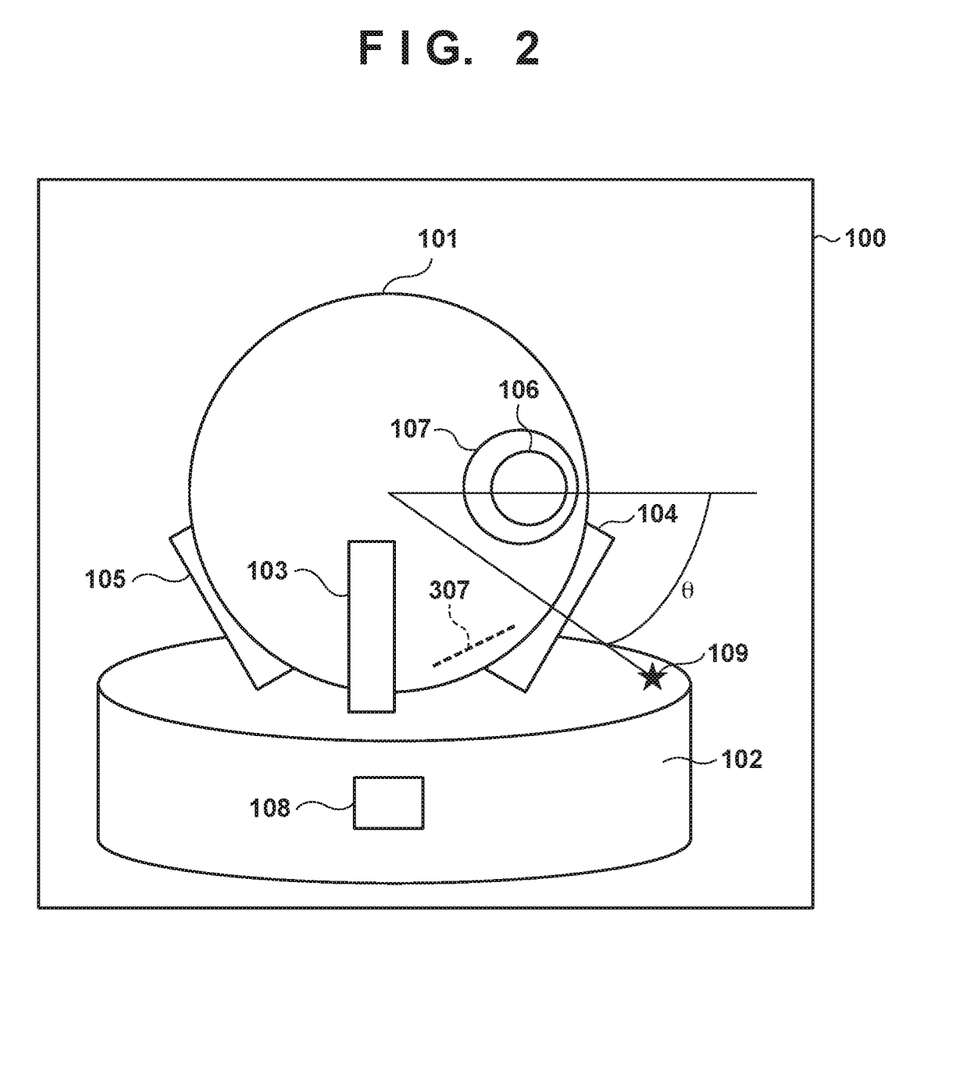
FIG. 2 is an external perspective view of an image capturing apparatus according to an embodiment of the present invention.
Figure 3:
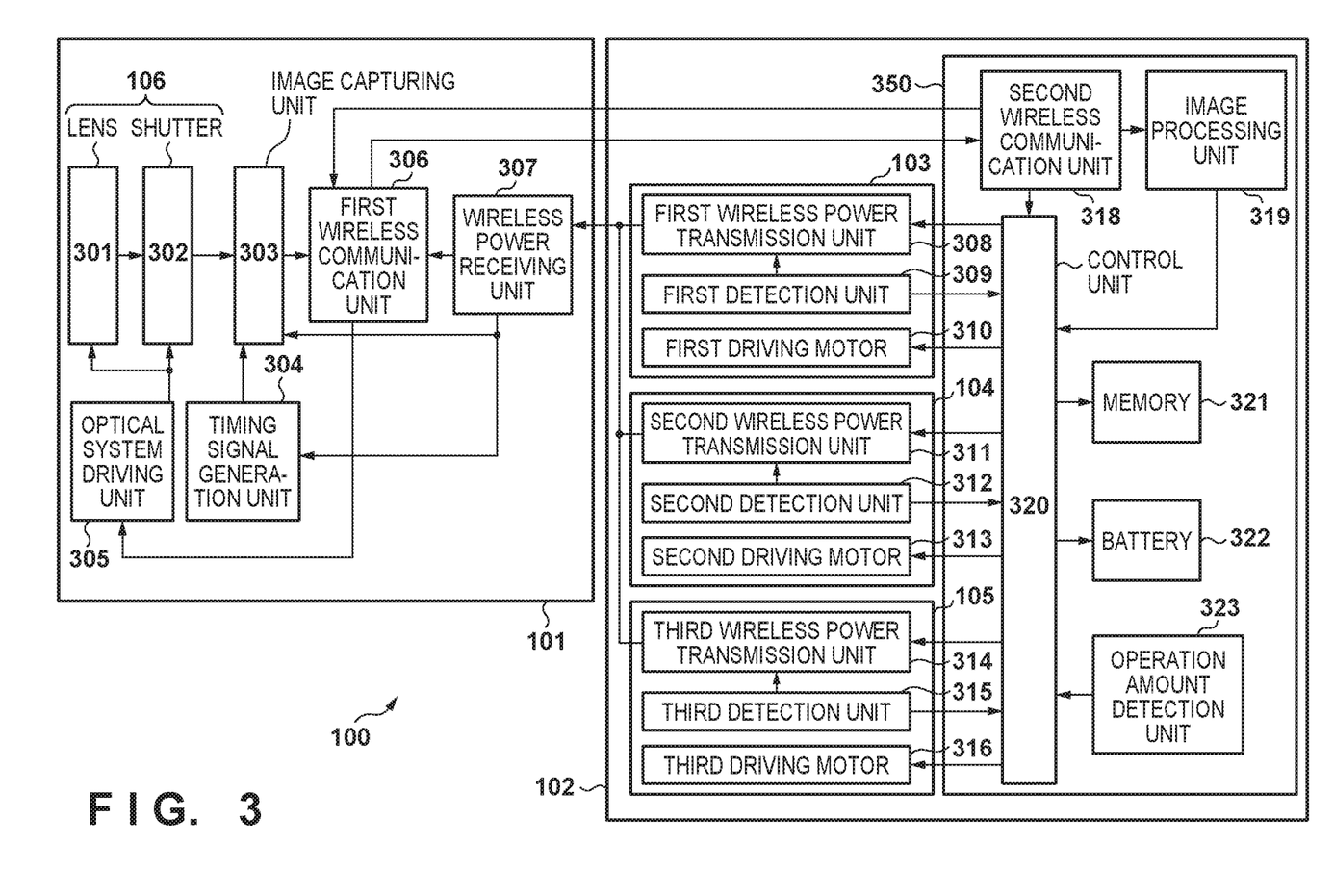
FIG. 3 is a view that illustrates a block configuration of the image capturing apparatus of the embodiment.

FIG. 2 is a view illustrating a state where the sphere portion 101 has been caused to rotate θ° from the reference position indicated in FIG. 1. The basic configuration is similar to that of FIG. 1, and thus explanation thereof is omitted. In FIG. 2, because the sphere portion 101 has rotated θ° from the position of FIG. 1, the wireless power receiving unit 307 has also rotated the same θ°. FIG. 3 is a view illustrating a block configuration of the image capturing apparatus 100 in the present embodiment. In FIG. 3, the sphere portion 101 is provided with the image capturing optical system 106, which has a lens 301 and a shutter 302; an image capturing unit 303; a timing signal generation unit 304; an optical system driving unit 305 for driving the image capturing optical system 106; a first wireless communication unit 306; and the wireless power receiving unit 307.

The image capturing unit 303 is provided with an image capturing element such as a CCD or a CMOS sensor for converting an optical image to an electrical signal. The timing signal generation unit 304 generates a timing signal for causing the image capturing unit 303 to operate. The optical system driving unit 305 drives each of the lens 301 and the shutter 302 to perform focus adjustment or exposure control. The first wireless communication unit 306 has an interface that conforms to IEEE 802.11, for example. The first wireless communication unit 306 is connected by a network to a communication device supporting the same communication standard, and can transmit and receive an image or a moving image. In the present embodiment, communication is performed between the sphere portion 101 and the base portion 102 by the first wireless communication unit 306 communicating with a second wireless communication unit 318 which is described later. The wireless power receiving unit 307 can wirelessly receive power supplied from the base portion 102, and can supply power to necessary parts of the sphere portion 101.

In contrast, the base portion 102 has the first support portion 103, the second support portion 104, the third support portion 105, and a base portion main body 350. The first support portion 103 has a first wireless power transmission unit 308, a first detection unit 309, and a first driving motor 310. The first wireless power transmission unit 308 supplies power wirelessly to the sphere portion 101 via the wireless power receiving unit 307. The first detection unit 309 detects a transmission wave from the first wireless power transmission unit 308 and a reflection wave from the wireless power receiving unit 307 to thereby detect power supply efficiency with respect to the sphere portion 101, and outputs a detection result to a control unit 320. The first driving motor 310 causes the sphere portion 101 to rotate by a necessary amount, after an amount of rotation is controlled by the control unit 320 based on an output from an operation amount detection unit 323.

Note that the second support portion 104 is provided with a second wireless power transmission unit 311, a second detection unit 312, and a second driving motor 313, similarly to the first support portion 103. The third support portion 105 similarly has a third wireless power transmission unit 314, a third detection unit 315, and a third driving motor 316. The basic configurations of the second support portion 104 and the third support portion 105 are similar to that of the first support portion 103, and thus explanation thereof is omitted.

In addition, the first wireless power transmission unit 308, the second wireless power transmission unit 311, and the third wireless power transmission unit 314 may perform power transmission simultaneously in accordance with collaborative control by respective wireless power transmission units. However, in a case where simultaneous power transmission is performed in accordance with collaborative control of the first wireless power transmission unit 308, the second wireless power transmission unit 311, and the third wireless power transmission unit 314, a NULL point that is a position where power cannot be transmitted due to mutual negation of power transmission waves occurs. Accordingly, the control unit 320 adjusts transmission power levels of the first wireless power transmission unit 308, the second wireless power transmission unit 311, and the third wireless power transmission unit 314 so that the position of the wireless power receiving unit 307 does not become the NULL point.

Next, the base portion main body 350 is configured by being provided with the second wireless communication unit 318, an image processing unit 319, the control unit 320, a memory 321, a battery 322, and the operation amount detection unit 323. The second wireless communication unit 318 can transmit and receive a data signal with respect to the sphere portion 101. This data signal includes, for example, control data of the sphere portion 101 or image data. The second wireless communication unit 318 has an interface that conforms to IEEE 802.11, for example. The second wireless communication unit 318 is connected with a communication device supporting the same communication standard by a network, and can transmit and receive an image or a moving image.

The image processing unit 319 is configured by being provided with a correlated double sampling unit for performing analog signal processing of an output signal from the image capturing unit 303 of the sphere portion 101, a programmable gain amplification unit that can set a desired gain, an analog-digital converter unit, or the like. An image signal from the image processing unit 319 is written to the memory 321 via the control unit 320. The memory 321 is provided with sufficient storage capacity to store a predetermined number of still images, or a predetermined amount of time of moving images and audio.

The battery 322, which is rechargeable, supplies needed power to each necessary block of the base portion 102. The operation amount detection unit 323 captures a surface of the sphere portion 101 by using an image capturing element, for example, measures an amount of rotation and a driving direction of the sphere portion 101 from a movement amount of a represented feature point in accordance with image processing, and outputs the driving direction and the amount of rotation to the control unit 320.

The control unit 320 is configured by a CPU that incorporates a storage unit, and controls the entirety of the image capturing apparatus 100 which includes the sphere portion 101 and the base portion 102. More specifically, the control unit 320 holds, in the storage unit, information relating to position such as a current position and the reference position of the sphere portion 101, programs storing processing procedures for an image capturing operation or an operation for transmitting power to the sphere portion 101, or the like. The control unit 320 controls the entirety of the image capturing apparatus 100 in accordance with this information and these programs. In addition, the control unit 320 can always ascertain the rotational position of the sphere portion 101 by ascertaining, in accordance with a detection result by the operation amount detection unit 323, how far and in what direction the sphere portion 101 has rotated from the reference position.

Figure 4:
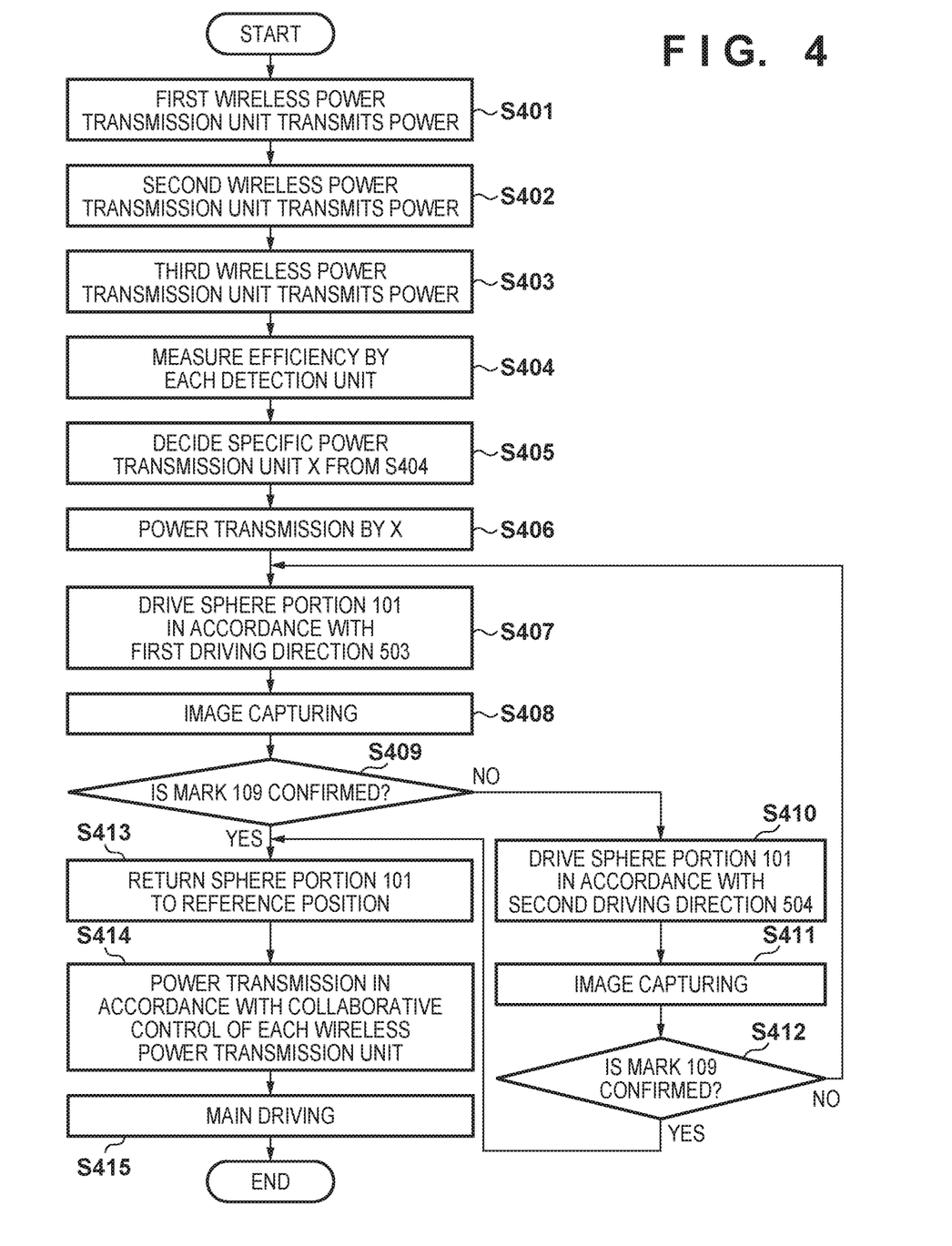
FIG. 4 is a flowchart that illustrates an operation for returning a sphere portion of the embodiment to a reference position.

FIG. 4 is a flowchart that illustrates an operation for aligning the sphere portion 101 to the reference position immediately after power supply activation of the image capturing apparatus 100.

When the power supply of the image capturing apparatus 100 is turned on by a user, the control unit 320, in step S401, controls so that the first wireless power transmission unit 308 of the base portion 102 transmits power to the sphere portion 101 via the wireless power receiving unit 307. Here, when the base portion 102 returns the sphere portion 101 to the reference position, each of the first through third wireless power transmission units are used in order to transmit power to the sphere portion 101, and collaborative control in which the plurality of wireless power transmission units are used at the same time to transmit power is not performed. This is because, immediately after power supply activation of the image capturing apparatus 100, it is unknown what the rotational position of the wireless power receiving unit 307 of the sphere portion 101 is. In other words, immediately after power supply activation of the image capturing apparatus 100, there is the possibility that the wireless power receiving unit 307 is positioned at the NULL point which occurs in accordance with power transmission by collaborative control of the respective wireless power transmission units. Accordingly, in the present embodiment, when the sphere portion 101 is returned to the reference position, the sphere portion 101 is driven in accordance with power supplied from one wireless power transmission unit out of the wireless power transmission units. However, if the position of the NULL point has already been ascertained, simultaneous power transmission in accordance with collaborative control of the wireless power transmission units may be performed when returning the sphere portion 101 to the reference position.

In step S402, the control unit 320 controls so that the second wireless power transmission unit 311 of the base portion 102 transmits power to the sphere portion 101 via the wireless power receiving unit 307. In step S403, the control unit 320 controls so that the third wireless power transmission unit 314 of the base portion 102 transmits power to the sphere portion 101 via the wireless power receiving unit 307.

In step S404, the control unit 320 calculates each power transmission efficiency of the first through third wireless power transmission units 308, 311, and 314 by using respective detection results by the first through third detection units 310, 313, and 316. In step S405, the control unit 320, based on the calculation result of step S404, decides a wireless power transmission unit with the best efficiency out of the first through third wireless power transmission units 308, 311, and 314 to be X. In step S406, the control unit 320 controls so as to transmit power from the wireless power transmission unit X to the entirety of the sphere portion 101 via the wireless power receiving unit 307.

Figure 5:
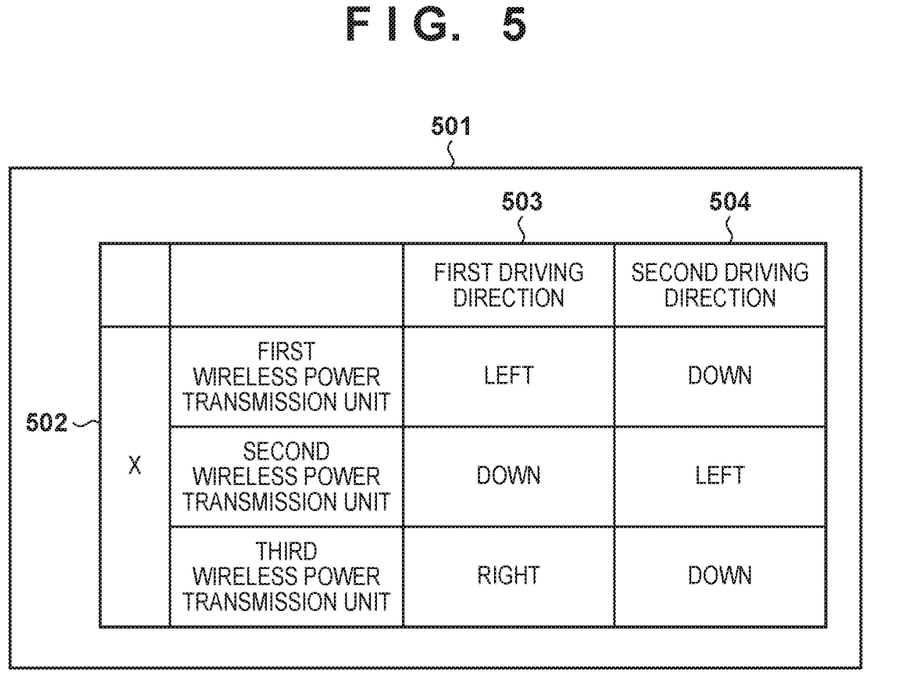
FIG. 5 is a view that illustrates a table that records driving directions managed by a control unit.

In step S407, the control unit 320 controls so as to cause the sphere portion 10110 be rotationally driven in a direction 503 obtained from a table 501 illustrated in FIG. 5 and information of the wireless power transmission unit X decided in step S405, so that the rotation position of the sphere portion 101 returns to the reference position.

Description is given here regarding the table 501 which is stored by the control unit 320. FIG. 5 is a view illustrating a driving direction table 501, which is stored by the control unit 320, in which is stored relationships between the positions of the first through third wireless power transmission units 308, 311, and 314 and driving directions for returning the sphere portion 101 to the reference position. As illustrated by FIG. 5, the table 501 stores a list of wireless power transmission units 502 in a vertical axis and stores in the horizontal axis a list of first driving directions 503 and a list of second driving directions 504 (a plurality of types of lists) of the sphere portion 101 that correspond to the vertical axis.

If the wireless power transmission unit X determined in step S405 is the first wireless power transmission unit 308, the control unit 320 refers to the first wireless power transmission unit 308 from the list of wireless power transmission units 502 which is in the vertical axis of the table 501. From the list of first driving directions 503 in the horizontal axis, the rotational direction of the sphere portion 101 is decided to be a leftward direction looking from the image capturing unit 303.

Note that, although a leftward direction is given in the present embodiment, it is assumed that, for driving directions of the list of first driving directions 503, driving directions for returning the sphere portion 101 to the reference position based on the position of the first through third wireless power transmission units 308, 311, and 314 are stored. In addition, an amount of rotation of the sphere portion 101 may be stored in a first table 501.

The list of second driving directions 504 stores driving directions of the sphere portion 101 similarly to the list of first driving directions 503. In the present embodiment, configuration is such that, if the sphere portion 101 is not returned to the reference position even if it is rotationally driven in a driving direction stored in the list of first driving directions 503, the sphere portion 101 is driven in a driving direction stored in the list of second driving directions 504.

Meanwhile, if the wireless power transmission unit X determined in step S405 is the second wireless power transmission unit 311, the control unit 320 controls so that the sphere portion 101 is rotationally driven in a downward direction, from the list of first driving directions 503. Similarly, control is performed so that, if the wireless power transmission unit X is the third wireless power transmission unit 314, the sphere portion 101 is rotationally driven in a rightward direction. Note that, in the present embodiment, the driving direction of the sphere portion 101 is set as in the table of FIG. 5, but in the present invention, the driving direction is not limited to this table. In addition, in the present embodiment, although there are two driving directions that are stored by the table 501, the present invention is not limited to two, and the number of lists of a driving directions stored by the table may be increased, as with a list of third driving directions and a list of fourth driving directions.

Here, the description of FIG. 4 is returned to, and by the operation of step S407, the sphere portion 101 moves to the reference position. Note that, in step S407, an operation in only one direction is recited. However, there is no limitation to this, and the sphere portion 101 may be moved in two or more directions, such as, during step S407, moving the sphere portion 101 in a direction stored in the list of first driving directions 503 and subsequently moving the sphere portion 101 in a direction stored in the list of second driving directions 504.

In step S408, the control unit 320 controls so as to perform image capturing by the image capturing unit 303 in order to confirm whether the sphere portion 101 has returned to the reference position. In step S409, the control unit 320 confirms, in accordance with image processing by the image processing unit 319, whether the mark 109 is included in the image captured in step S408. If the control unit 320 determines in step S409 that the mark 109 is not included in the image, the control unit 320 advances the processing to step S410. In step S410, the control unit 320, after determining that the sphere portion 101 has not returned to the reference position, controls so as to rotationally drive the sphere portion 101 in a direction stored in the list of second driving directions 504 of the table of FIG. 5. Subsequently the processing proceeds to step S411 and step S412, but the operations of step S411 and step S412 are similar to the operations of step S408 and step S409, and therefore explanation thereof is omitted.

In the present embodiment, description is such that the driving direction of the sphere portion 101 for when the mark 109 could not be confirmed in step S409 or step S412 is alternately selected from the list of first driving directions 503 and the list of second driving directions 504 stored in the table. However, the present invention is not limited to selecting the driving direction of the sphere portion 101 in this way. Configuration may be taken to further store in the table 501 a plurality of lists of driving directions such as a list of third driving directions and a list of fourth driving directions, and rotationally drive the sphere portion 101 in a different direction each time the mark 109 cannot be confirmed in step S409.

Meanwhile, if the control unit 320 can confirm in step S409 that the mark 109 is included in the image, the control unit 320 advances the processing to step S413. In step S413, the control unit 320 controls the first through third driving motors 310, 313, and 316 to rotationally drive the sphere portion 101 so that the mark 109 comes to the center of the image captured in step S408 from the position of the mark 109 that was confirmed in step S409. In step S413, the sphere portion 101 returns to the reference position due to driving by the driving motor.

In the present embodiment, in step S413, rotation of the sphere portion 101 is performed from the position of the mark 109 from the image captured in step S408, but the sphere portion 101 does not need to be caused to rotate with reference to the position of the mark 109 in an image captured by the image capturing unit 303. The control unit 320 may cause the sphere portion 101 to rotate based on only a list of driving directions stored in the table 501.

The control unit 320 can ascertain an accurate position of the wireless power receiving unit 307 after the sphere portion 101 returns to the reference position in step S413.

In step S414, the control unit 320 controls to cause power to be supplied to the wireless power receiving unit 307 of the sphere portion 101 by using collaborative control to perform power transmission by simultaneously using the first through third wireless power transmission units 308, 311, and 314 (a plurality). In this state, power transmission control is performed so that the first through third wireless power transmission units 308, 311, and 314 are optimal with respect to the position of the wireless power receiving unit 307. Accordingly, it is possible make transmission power smaller than power transmitted to the sphere portion 101 from the wireless power transmission unit X up until step S409. Having the transmission power level be large from step S401 to step S409 is in order to make it possible to operate the sphere portion 101 by power transmission from only one wireless power transmission unit, even if it is not possible to ascertain the position of the wireless power receiving unit 307 immediately after power supply activation of the image capturing apparatus 100.

In the present embodiment, the transmission power level from step S401 to step S409 is larger than the transmission power level in step S414. However, it does not need to be larger. For example, the power level may be made to be low if, with respect to the size of the sphere portion 101, there is a sufficient number of wireless power transmission units such that power transmission to the entirety of the sphere portion 101 is possible.

In step S415, because the sphere portion 101 returned to the reference position in step S413, the control unit 320 controls so as to cause a transition to a main operation sequence where a user can perform an operation.

As described above, by virtue of the embodiment described above, in an image capturing apparatus that transmits power to a sphere portion in accordance with wireless power supply, it is possible to return the sphere portion to a reference position at a time of power supply activation without incorporating a special sensor or the like for returning the sphere portion to the reference position.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-197056, filed Oct. 10, 2017, which is hereby incorporated by reference herein in its entirety.

What is claimed is:

1. An image capturing apparatus comprising a sphere portion operable to perform image capturing and a support unit for supporting the sphere portion, wherein
    the sphere portion comprises:
        an image capturing unit configured to capture an object image; and
        a power reception unit configured to wirelessly receive a supply of power, and
    the support unit comprises:
        a plurality of support portions that support the sphere portion, each support portion having a driving motor configured to rotationally drive the sphere portion, a power transmission unit configured to wirelessly supply power to the power reception unit, and a detection unit configured to detect a power supply efficiency by the power transmission unit; and
        a control unit configured to, based on power supply efficiencies detected by the detection unit, select the power transmission unit arranged in one support portion out of the plurality of support portions, and, based on a position of the selected power transmission unit, control the driving motor so that the sphere portion aligns to a predetermined reference position.

2. The image capturing apparatus according to claim 1, wherein the control unit controls the driving motor based on a table that stores a relationship between a position of the selected power transmission unit and a rotational direction for returning the sphere portion to the reference position.

3. The image capturing apparatus according to claim 2, wherein the table stores a plurality of types of rotational directions in association with the position of the selected power transmission unit, and the control unit controls the driving motor by selecting the plurality of types of rotational directions in order.

4. The image capturing apparatus according to claim 1, wherein the control unit causes the power transmission units respectively arranged in the plurality of support portions to operate in order, and detects, by the detection units respectively arranged in the plurality of support portions, power supply efficiencies of the power transmission units respectively arranged in the plurality of support portions.

5. The image capturing apparatus according to claim 4, wherein, after the sphere portion is aligned to the reference position, the control unit supplies power to the power reception unit in accordance with collaborative control after selecting a plurality of power transmission units out of the power transmission units respectively arranged in the plurality of support portions.

6. The image capturing apparatus according to claim 5, wherein power in a case of causing the power transmission units respectively arranged in the plurality of support portions to operate in order is greater than power in a case of supplying the power reception unit in accordance with collaborative control after selecting the plurality of power transmission units.

7. The image capturing apparatus according to claim 1, wherein the control unit selects the power transmission unit whose power supply efficiency detected by the detection unit is highest as a power transmission unit for deciding a rotational direction in order to return the sphere portion to the reference position.

8. The image capturing apparatus according to claim 1, wherein the detection unit detects the power supply efficiency by detecting a reflection wave when the power transmission unit transmits power to the power reception unit.

9. The image capturing apparatus according to claim 1, wherein the support unit has a visual mark, and the control unit determines, based on whether the mark is included in an image captured by the image capturing unit, whether the sphere portion is aligned to the reference position.

10. The image capturing apparatus according to claim 9, wherein the control unit controls the driving motor so that the mark becomes a center of an image captured by the image capturing unit.

11. The image capturing apparatus according to claim 1, further comprising an operation amount detection unit configured to detect, after the sphere portion is aligned to the reference position, a rotational position of the sphere portion from the reference position.

12. A support apparatus operable to support a sphere portion provided with an image capturing unit operable to capture an object image and a power reception unit operable to wirelessly receive a supply of power, the apparatus comprising:
 a plurality of support portions that support the sphere portion, each support portion having a driving motor configured to rotationally drive the sphere portion, a power transmission unit configured to wirelessly supply power to the power reception unit, and a detection unit configured to detect a power supply efficiency by the power transmission unit; and
 a control unit configured to, based on power supply efficiencies detected by the detection unit, select the power transmission unit arranged in one support portion out of the plurality of support portions, and, based on a position of the selected power transmission unit, control the driving motor so that the sphere portion aligns to a predetermined reference position.

13. A method of controlling an image capturing apparatus provided with: a sphere portion provided with an image capturing unit configured to capture an object image and a power reception unit configured to wirelessly receive a supply of power, and a support unit provided with a plurality of support portions that support the sphere portion, each support portion having a driving motor configured to rotationally drive the sphere portion, a power transmission unit configured to wirelessly supply power to the power reception unit, and a detection unit configured to detect a power supply efficiency by the power transmission unit, the method comprising:
 based on power supply efficiencies detected by the detection unit, selecting the power transmission unit arranged in one support portion out of the plurality of support portions, and, based on a position of the selected power transmission unit, controlling the driving motor so that the sphere portion aligns to a predetermined reference position.

14. A method of controlling a support apparatus provided with a plurality of support portions configured to support a sphere portion provided with an image capturing unit configured to capture an object image and a power reception unit configured to received supply of power wirelessly, each support portion having a driving motor configured to rotationally drive the sphere portion, a power transmission unit configured to wirelessly supply power to the power reception unit, and a detection unit configured to detect a power supply efficiency by the power transmission unit, the method comprising:
 based on power supply efficiencies detected by the detection unit, selecting the power transmission unit arranged in one support portion out of the plurality of support portions, and, based on a position of the selected power transmission unit, controlling the driving motor so that the sphere portion aligns to a predetermined reference position.

\* \* \* \* \*